United States Patent
Lee et al.

(10) Patent No.: US 12,487,887 B2
(45) Date of Patent: Dec. 2, 2025

(54) FILESET PARTITIONING FOR DATA STORAGE AND MANAGEMENT

(71) Applicant: Rubrik, Inc., Palo Alto, CA (US)

(72) Inventors: Looi Chow Lee, Mountain View, CA (US); Guilherme Vale Ferreira Menezes, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 34 days.

(21) Appl. No.: 18/098,677

(22) Filed: Jan. 18, 2023

(65) Prior Publication Data
US 2023/0267046 A1    Aug. 24, 2023

Related U.S. Application Data

(63) Continuation of application No. 15/897,084, filed on Feb. 14, 2018, now Pat. No. 11,579,978.

(51) Int. Cl.
| | |
|---|---|
| G06F 11/14 | (2006.01) |
| G06F 3/06 | (2006.01) |
| G06F 11/07 | (2006.01) |
| G06F 16/11 | (2019.01) |
| G06F 16/13 | (2019.01) |

(52) U.S. Cl.
CPC ........ *G06F 11/1435* (2013.01); *G06F 3/0644* (2013.01); *G06F 11/0712* (2013.01); *G06F 16/128* (2019.01); *G06F 16/13* (2019.01); *G06F 2201/84* (2013.01)

(58) Field of Classification Search
CPC .... G06F 11/1435; G06F 16/13; G06F 16/128; G06F 3/0644; G06F 11/0712; G06F 2201/84

USPC .......................................................... 707/649
See application file for complete search history.

(56) References Cited

U.S. PATENT DOCUMENTS

| | | | |
|---|---|---|---|
| 5,924,095 A * | 7/1999 | White | G06F 9/466 |
| 8,074,035 B1 | 12/2011 | Per et al. | |
| 9,460,147 B1 * | 10/2016 | Chang | G06F 16/13 |
| 10,042,711 B1 * | 8/2018 | Chopra | G06F 11/1448 |
| 10,387,073 B2 * | 8/2019 | Bhagi | G06F 3/0664 |
| 10,423,493 B1 * | 9/2019 | Vig | G06F 11/1471 |
| 10,656,865 B1 * | 5/2020 | Janse van Rensburg | G06F 3/061 |
| 10,659,523 B1 * | 5/2020 | Joseph | H04L 67/10 |
| 10,853,182 B1 * | 12/2020 | Vig | G06F 16/23 |
| 10,990,581 B1 * | 4/2021 | Jain | G06F 16/2358 |
| 11,579,978 B2 | 2/2023 | Lee et al. | |
| 11,620,191 B2 | 4/2023 | Wang et al. | |

(Continued)

FOREIGN PATENT DOCUMENTS

KR    20110125788 A    11/2011

*Primary Examiner* — Mark E Hershley
*Assistant Examiner* — Abdullah A Daud
(74) *Attorney, Agent, or Firm* — Holland & Hart LLP

(57) ABSTRACT

In one approach, filesets to be backed up are divided into partitions and snapshots are pulled for each partition. In one architecture, a data management and storage (DMS) cluster includes a plurality of peer DMS nodes and a distributed data store implemented across the peer DMS nodes. One of the peer DMS nodes receives fileset metadata for the fileset and defines a plurality of partitions for the fileset based on the fileset metadata. The peer DMS nodes operate autonomously to execute jobs to pull snapshots for each of the partitions and to store the snapshots of the partitions in the distributed data store.

20 Claims, 13 Drawing Sheets

(56) References Cited

U.S. PATENT DOCUMENTS

| | | | |
|---|---|---|---|
| 2005/0187992 A1* | 8/2005 | Prahlad | G06F 11/1446 |
| 2005/0203973 A1* | 9/2005 | Yagawa | G06F 11/2094 |
| 2005/0234867 A1* | 10/2005 | Shinkai | G06F 16/176 |
| 2007/0288490 A1 | 12/2007 | Longshaw | |
| 2011/0078118 A1 | 3/2011 | Kushwah | |
| 2011/0145207 A1* | 6/2011 | Agrawal | G06F 16/1748 707/E17.002 |
| 2011/0153650 A1* | 6/2011 | Lee | G06F 16/10 707/769 |
| 2011/0219208 A1* | 9/2011 | Asaad | G06F 9/06 712/12 |
| 2012/0089775 A1* | 4/2012 | Ranade | G06F 16/183 711/170 |
| 2013/0283097 A1* | 10/2013 | Chen | G06F 9/5027 718/103 |
| 2014/0006465 A1 | 1/2014 | Davis et al. | |
| 2014/0047342 A1* | 2/2014 | Breternitz | G06F 9/5061 715/735 |
| 2014/0280520 A1* | 9/2014 | Baier | H04L 69/18 709/203 |
| 2015/0074168 A1* | 3/2015 | Hartman | H04L 61/5007 709/201 |
| 2015/0212897 A1* | 7/2015 | Kottomtharayil | G06F 16/128 714/20 |
| 2015/0234846 A1* | 8/2015 | Moore | G06F 16/137 707/747 |
| 2015/0244795 A1 | 8/2015 | Cantwell et al. | |
| 2015/0309765 A1* | 10/2015 | Nagahara | H04M 3/567 345/2.2 |
| 2015/0348177 A1* | 12/2015 | Craft | H04L 43/0852 705/307 |
| 2016/0048342 A1* | 2/2016 | Jia | G06F 3/0689 711/114 |
| 2017/0003899 A1* | 1/2017 | Raja | G06F 11/14 |
| 2017/0090688 A1 | 3/2017 | Anderson et al. | |
| 2017/0099200 A1* | 4/2017 | Ellenbogen | G06N 20/00 |
| 2017/0109243 A1* | 4/2017 | Kumar | G06F 9/45529 |
| 2017/0371748 A1* | 12/2017 | Levy | G06F 16/283 |
| 2018/0081766 A1* | 3/2018 | Ghuge | G06F 3/067 |
| 2018/0107562 A1* | 4/2018 | Goodman | G06F 11/1451 |
| 2018/0152512 A1* | 5/2018 | Nung | G06F 3/0635 |
| 2018/0300242 A1* | 10/2018 | Liu | G06F 16/00 |
| 2018/0314749 A1* | 11/2018 | Raja | G06F 11/1458 |
| 2018/0349095 A1* | 12/2018 | Wu | G06F 3/0643 |
| 2019/0026187 A1* | 1/2019 | Gulam | G06F 16/128 |
| 2019/0205449 A1 | 7/2019 | Erickson et al. | |
| 2019/0243547 A1* | 8/2019 | Duggal | G06F 3/0619 |
| 2019/0354390 A1* | 11/2019 | Gill | G06F 11/3055 |
| 2019/0391880 A1 | 12/2019 | Wang et al. | |
| 2020/0034248 A1 | 1/2020 | Nara et al. | |
| 2020/0104216 A1* | 4/2020 | Wang | G06F 11/1466 |
| 2020/0404055 A1* | 12/2020 | Kusters | G06F 3/065 |
| 2021/0117289 A1* | 4/2021 | Lin | G06F 11/1453 |

* cited by examiner

| Service Schedule 222 | | |
|---|---|---|
| machine_user_id | machine_id | SLA |
| VM01 | m001 | standard VM |
| VM02 | m002 | standard VM |
| PM04 | m003 | standard PM |
| VM07 | m004 | high frequency |
| PM01 | m005 | short life |
| | ... | |

FIG. 3A

Job Queue 224

| job_id | start_time | job_type | job_info |
|---|---|---|---|
| 00001 | 0600 | pull snapshot | target = m001 |
| 00002 | 0610 | replicate | target = m003 |
| 00003 | 0615 | run analytics | target = m002 |
| 00004 | 0615 | trash collection | xxx |
| . . . | | | |

FIG. 3B

Job Queue 224

| job_id | start_time | job_type | job_info |
|---|---|---|---|
| 00002 | 0610 | replicate | target = m003 |
| 00003 | 0615 | run analytics | target = m002 |
| 00004 | 0615 | trash collection | xxx |
| . . . | | | |
| 00011 | 0605 | fetch data | target = m001/p001 |
| 00012 | 0605 | fetch data | target = m001/p002 |
| 00013 | 0605 | fetch data | target = m001/p003 |
| . . . | | | |

FIG. 3C

Partition Table 225

| p_id | parent_id | p_definition |
|---|---|---|
| m001/p001 | m001 | /a-/c |
| m001/p002 | m001 | /d-/ej |
| m001/p003 | m001 | /ek-/h |
| ... | | |
| random_name1 | m001/p001 | /aa-/af |
| random_name2 | m001/p001 | /ag-/at |
| ... | | |

FIG. 3E

Partition Table 225

| p_id | parent_id | p_definition |
|---|---|---|
| m001/p001 | m001 | /a-/c |
| m001/p002 | m001 | /d-/ej |
| m001/p003 | m001 | /ek-/h |
| ... | | |

FIG. 3D

Snapshot Table 226

| ss_id | ss_time | im_list |
|---|---|---|
| m001/p001.ss1 | 20171001.0300 | m001/p001.im1 |
| m001/p001.ss2 | 20171001.0900 | m001/p001.im1, m001/p001.im1-2 |
| m001/p001.ss3 | 20171001.1500 | m001/p001.im1, m001/p001.im1-2, m001/p001.im2-3 |
| m001/p001.ss4 | 20171001.2100 | m001/p001.im1, m001/p001.im1-2, m001/p001.im2-3, m001/p001.im3-4 |
| m001/p001.ss5 | 20171002.0300 | . . . |
| . . . | | |

FIG. 3F

Image Table 228

| im_id | im_location |
|---|---|
| m001/p001.im1 | . . . |
| m001/p001.im1-2 | |
| m001/p001.im2-3 | |
| m001/p001.im3-4 | |
| . . . | |

FIG. 3G

Snapshot Table 226

| ss_id | ss_time | im_list |
|---|---|---|
| m001/p001.ss1 | 20171001.0300 | m001/p001.im1 |
| m001/p001.ss2 | 20171001.0900 | m001/p001.im1, m001/p001.im1-2 |
| m001/p001.ss3 | 20171001.1500 | m001/p001.im1, m001/p001.im1-2, m001/p001.im2-3 |
| m001/p001.ss4 | 20171001.2100 | m001/p001.im1, m001/p001.im1-2, m001/p001.im2-3, m001/p001.im3-4 |
| m001/p001.ss5 | 20171002.0300 | m001/p001.im1, . . ., m001/p001.im4-5 |
| . . . | | |
| m001/p001.ss12 | 20171003.2100 | m001/p001.im1, . . ., m001/p001.im11-12 |

FIG. 4A

Image Table 228

| im_id | im_location |
|---|---|
| m001/p001.im1 | . . . |
| m001/p001.im1-2 | |
| m001/p001.im2-3 | |
| m001/p001.im3-4 | |
| m001/p001.im4-5 | |
| . . . | |
| m001/p001.im11-12 | |

FIG. 4B

Snapshot Table 226

| ss_id | ss_time | im_list |
|---|---|---|
| m001.p001.ss1 | 20171001.0300 | m001.p001.im5-1 |
| m001.p001.ss2 | 20171001.0900 | m001.p001.im1, m001.p001.im1-2 |
| m001.p001.ss3 | 20171001.1500 | m001.p001.im1, m001.p001.im1-2, m001.p001.im2-3 |
| m001.p001.ss4 | 20171001.2100 | m001.p001.im1, m001.p001.im1-2, m001.p001.im2-3, m001.p001.im3-4 |
| m001.p001.ss5 | 20171002.0300 | m001.p001.im5 |
| ... | | |
| m001.p001.ss12 | 20171003.2100 | m001.p001.im5, ..., m001.p001.im11-12 |

FIG. 4C

Image Table 228

| im_id | im_location |
|---|---|
| m001.p001.im1 | ... |
| m001.p001.im1-2 | |
| m001.p001.im2-3 | |
| m001.p001.im3-4 | |
| m001.p001.im4-5 | |
| ... | |
| m001.p001.im11-12 | |
| m001.p001.im5 | |
| m001.p001.im5-1 | |

FIG. 4D

FILESET PARTITIONING FOR DATA STORAGE AND MANAGEMENT

CROSS-REFERENCE TO RELATED APPLICATIONS

This application is a continuation of U.S. patent application Ser. No. 15/897,084 by Lee et al., "Fileset Partitioning for Data Storage and Management," filed Feb. 14, 2018, assigned to the assignee hereof, and expressly incorporated by reference herein.

BACKGROUND

1. Technical Field

The present invention generally relates to managing and storing data, for example for backup purposes.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically also includes backup and retrieval of the virtual machines, in addition to just the application data.

As the amount of data to be backed up and recovered increases, there is a need for better approaches to backup.

SUMMARY

In one approach, filesets to be backed up are divided into partitions and snapshots are pulled for each partition. In one architecture, a data management and storage (DMS) cluster includes a plurality of peer DMS nodes and a distributed data store implemented across the peer DMS nodes. One of the peer DMS nodes receives fileset metadata for the fileset and defines a plurality of partitions for the fileset based on the fileset metadata. The peer DMS nodes operate autonomously to execute jobs to pull snapshots for each of the partitions and to store the snapshots of the partitions in the distributed data store.

Other aspects include components, devices, systems, improvements, methods, processes, applications, computer readable mediums, and other technologies related to any of the above.

BRIEF DESCRIPTION OF THE DRAWINGS

FIGS. 3A-3G are DMS tables that illustrate operation of the system of FIGS. 2A-2B, according to one embodiment.

FIGS. 4A-4D are DMS tables that illustrate incremental updating of snapshot images, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
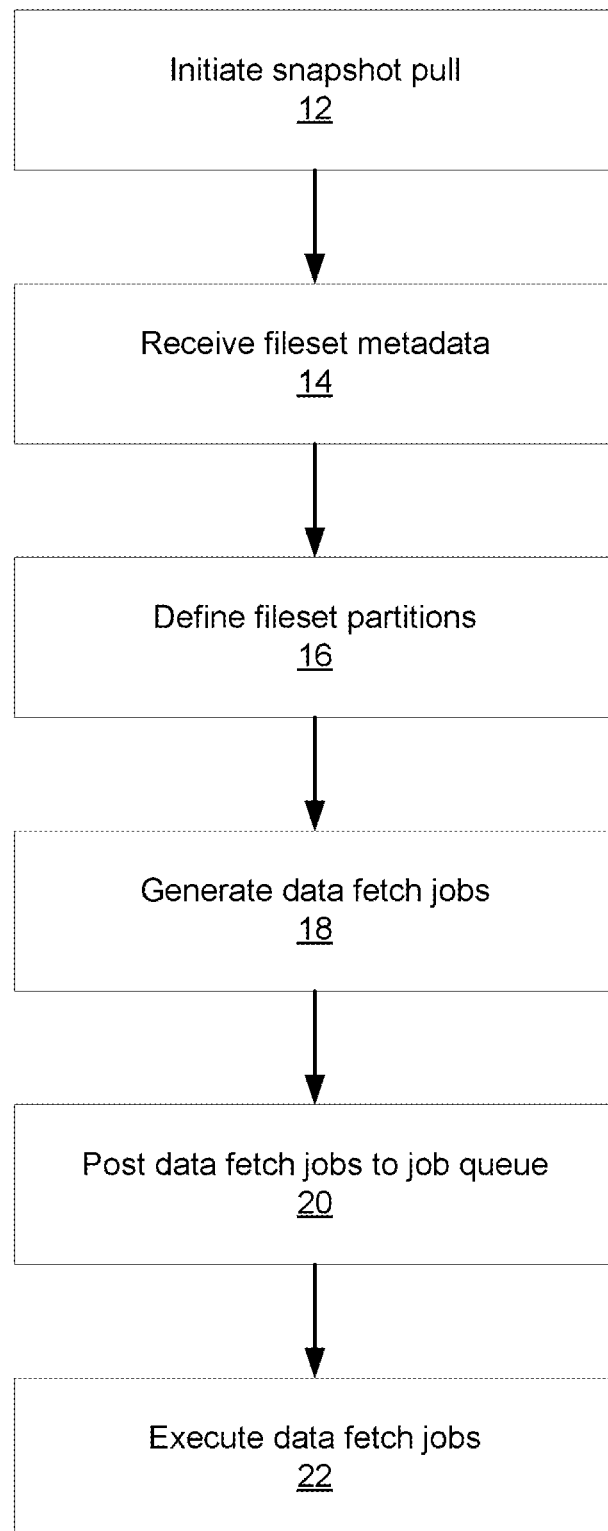
FIG. 1 is a flowchart of a method for storing a snapshot using partitions, according to one embodiment.

FIG. 1 is a flowchart of a method for a data management and storage (DMS) cluster to pull a snapshot of a fileset using partitions, according to one embodiment. In this example, the DMS cluster provides a backup service to a compute infrastructure having one or more machines. From time to time, the DMS cluster pulls snapshots of filesets from the compute infrastructure. The DMS cluster includes a number of peer nodes that can autonomously access the compute infrastructure in parallel. Both the compute infrastructure and an example of the DMS cluster are further described in conjunction with FIGS. 2A-2B.

In the method of FIG. 1, the DMS cluster uses the capability of the peer nodes to access the compute infrastructure in parallel to improve performance when pulling a snapshot of a fileset. Upon initiation 12 of a snapshot pull, the DMS cluster receives 14 fileset metadata describing the fileset, which may include file hierarchies, file sizes, and file content types. Based on this fileset metadata, if necessary, the DMS cluster divides the fileset into partitions, defining 16 the partitions for the fileset. It generates 18 jobs to fetch each partition. These data fetch jobs are posted 20 to the job queue, where the peer DMS nodes in the cluster can retrieve and execute 22 the jobs autonomously. When the DMS cluster pulls a subsequent snapshot of the fileset, the partition structure is maintained and each partition is incrementally updated. Details for an example implementation are further discussed in conjunction with FIGS. 4 and 5.

FIGS. 2-5 describe an example implementation. FIG. 2A is a block diagram illustrating a system for managing and storing data, according to one embodiment. The system includes a DMS cluster 112x, a secondary DMS cluster 112y and an archive system 120. The DMS system provides data management and storage services to a compute infrastructure 102, which may be used by an enterprise such as a corporation, university, or government agency. Many different types of compute infrastructures 102 are possible. Some examples include serving web pages, implementing e-commerce services and marketplaces, providing compute resources for an enterprise's internal use, and implementing databases storing user files. The compute infrastructure 102 can include production environments, in addition to development or other environments.

In this example, the compute infrastructure 102 includes both virtual machines (VMs) 104a-j and physical machines (PMs) 108a-k. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108a-n can also use different operating systems running various applications. Microsoft Windows running Microsoft SQL or Oracle databases, and Linux running web servers are some examples. The operating systems may also use different filesystem implementations, such as New Technology File System (NTFS), File Allocation Table (FAT), third extended filesystem (ext3), and fourth extended filesystem (ext4).

The DMS cluster 112 manages and stores data for the compute infrastructure 102. This can include the states of machines 104, 108, configuration settings of machines 104, 108, network configuration of machines 104, 108, and data stored on machines 104, 108. Example DMS services includes backup, recovery, replication, archival, and analytics services. The primary DMS cluster 112x enables near instant recovery of backup data. Derivative workloads (e.g., testing, development, and analytic workloads) may also use the DMS cluster 112x as a primary storage platform to read and/or modify past versions of data.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

Archive system 120 archives data for the computer infrastructure 102. The archive system 120 may be a cloud service. The archive system 120 receives data to be archived from the DMS clusters 112. The archived storage typically is "cold storage," meaning that more time is required to retrieve data stored in archive system 120. In contrast, the DMS clusters 112 provide much faster backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines. The DMS nodes 114 are interconnected with each other, for example, via cable, fiber, backplane, and/or network switch. The end user does not interact separately with each DMS node 114, but interacts with the DMS nodes 114a-n collectively as one entity, namely, the DMS cluster 112.

The DMS nodes 114 are peers and preferably each DMS node 114 includes the same functionality. The DMS cluster 112 automatically configures the DMS nodes 114 as new nodes are added or existing nodes are dropped or fail. For example, the DMS cluster 112 automatically discovers new nodes. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, such as the definitions of the various partitions for a fileset, as will be described in more detail in FIG. 2B. In the following examples, these are shown as tables but other data structures could also be used. The data store 118 contains the actual backup data from the compute infrastructure 102, for example snapshots of the partitions of the filesets being backed up. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Figure 2A:
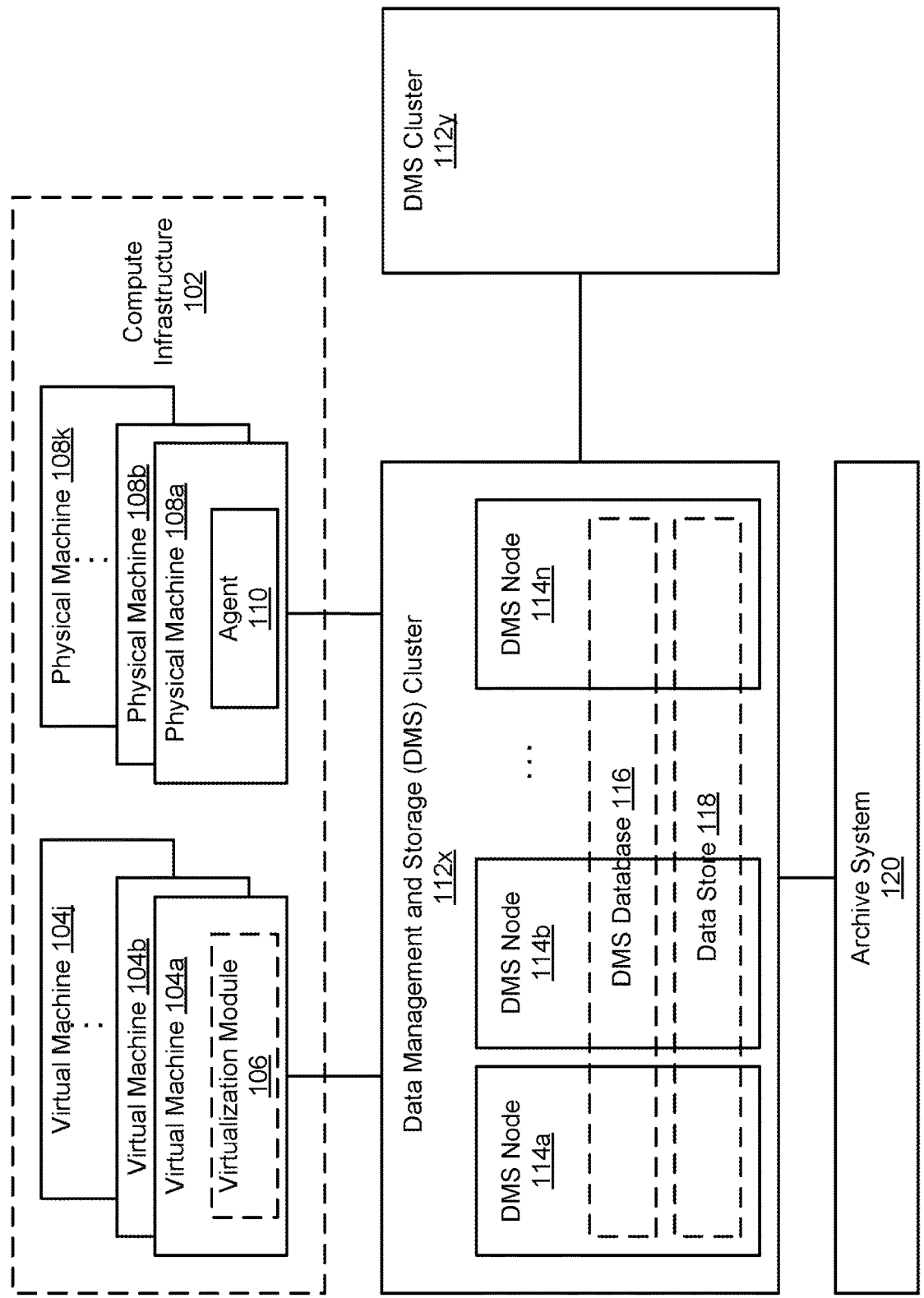
FIG. 2A is a block diagram of a data management and storage (DMS) system, according to one embodiment.

Considering each of the other components shown in FIG. 2A, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

Figure 2B:
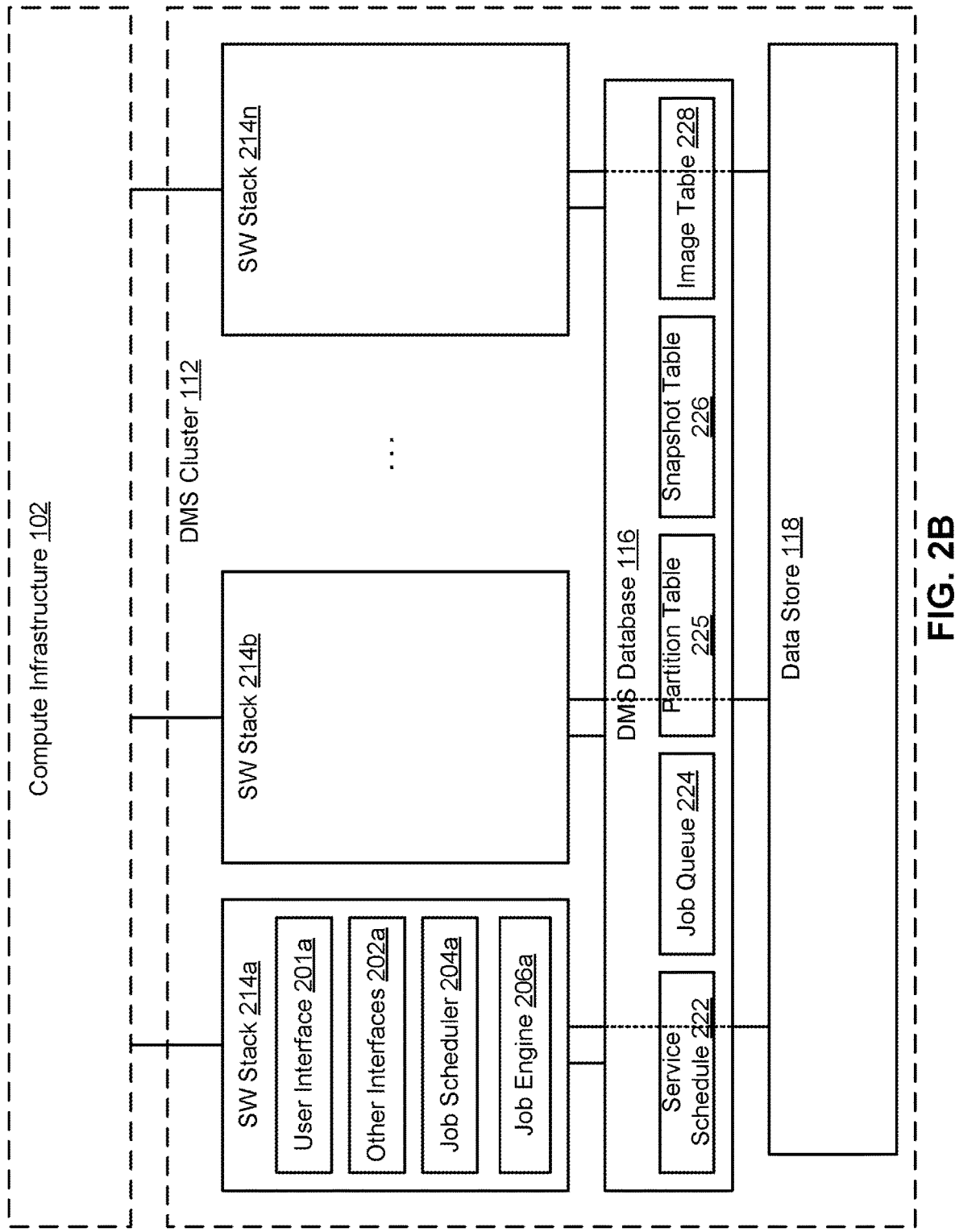
FIG. 2B is a logical block diagram of a DMS cluster, according to one embodiment.

FIG. 2B is a logical block diagram illustrating an example DMS cluster 112, according to one embodiment. This logical view shows the software stack 214a-n for each of the DMS nodes 114a-n of FIG. 2A. Also shown are the DMS database 116 and data store 118, which are distributed across the DMS nodes 114a-n. Preferably, the software stack 214 for each DMS node 114 is the same. This stack 214a is shown only for node 114a in FIG. 2A. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a partition table 225, a snapshot table 226 and an image table 228. In the following examples, these are shown as tables but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2B, this information is stored in the service schedule 222. The user interface 201 can also be used to allow the user to run diagnostics, generate reports or calculate analytics.

The software stack 214 also includes other interfaces 202. For example, there is an interface 202 to the computer infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The partition table 225 is a data structure that defines one or more partitions of a fileset, as determined by the DMS cluster 112. Using the method of FIG. 1, filesets to be backed up are divided into one or more partitions prior to the DMS cluster 112 capturing snapshots of the data. The partition table 225 indicates which portion of a fileset is associated with each partition. For example, partition i may contain files/a-/c of a fileset for machine x; partition ii contains files /d-/f, and so on. More details of example implementations are provided in FIG. 3 below.

The snapshot table 226 and image table 228 are data structures that index the snapshots captured by the DMS cluster 112. If a fileset is divided into multiple partitions, then the DMS cluster 112 pulls snapshots of each partition and the snapshot table indexes these partition snapshots. In this example, snapshots are decomposed into images, which are stored in the data store 118. The snapshot table 226 describes which images make up each snapshot. For example, the snapshot of partition i of machine x taken at time y can be constructed from images a,b,c. The image table is an index of images to their location in the data store. For example, image a is stored at location aaa of the data store 118, image b is stored at location bbb, etc. More details of example implementations are provided in FIG. 3 below.

DMS database 116 also stores metadata information, such as fileset metadata information, for the data in the data store 118. The metadata information may include file names, file sizes, file content types, permissions for files, various times such as when the file was created or last modified.

FIGS. 3-5 illustrate operation of the DMS system shown in FIG. 2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that DMS cluster can find the machine in the compute infrastructure. It is also identified by machine_id, which is a unique ID used internally by the DM cluster. In this example, there is a mix of virtual machines (VMxx) and physical machines (PMxx). The machines are also identified by machine_id, which is a unique ID used internally by the DM cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 112y.

Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIGS. 3B-C are examples of a job queue 224. Each row is a separate job. job_id identifies a job and start_time is the scheduled start time for the job. job_type defines the job to be performed and job_info includes additional information for the job. The jobs in queue 224 are accessible by any of the job engines 206, although some may be assigned or preferred to specific DMS nodes. The jobs in queue 224 are accessible by any of the job engines 206, although some may be assigned or preferred to specific DMS nodes.

FIG. 3B shows a job queue 224 at a time prior to the start_time of job 00001 in the queue 224. Job 00001 is a job to "pull snapshot" (i.e., take backup) of machine m001. Job 00002 is a job to replicate the backup for machine m003 to the secondary DMS cluster. Job 00003 runs analytics on the backup for machine m002. Job 00004 is an internal trash collection job. When a node of the DMS cluster 112 executes job 00001 to pull a snapshot of machine m001, it begins the method of FIG. 1 to possibly partition the fileset for machine m001 instead of taking a single snapshot of the entire fileset.

In this example, the fileset m001 is partitioned into multiple partitions, which are denoted as m001/p001, m001/p002, etc. This also generates jobs to fetch data for each of the partitions, as shown in the job queue 224 of FIG. 3C. Job 00011 is a job to fetch data for partition m001/p001, job 00012 is a job to fetch data for partition m001/p002, and so on. The partition table is also updated. FIG. 3D is an example of a partition table 225, illustrating the partitioning of machine m001. Each row of the partition table 225 is a different partition, identified by a partition ID "p_id." In this example, each partition ID specifies the machine and the partition. For example, "m001/p001" is partition p001 of machine m001. "parent_id" identifies the parent of the partition, which is m001 in this example. "p_definition" defines the partition. For example, partition m001/p001 contains files /a-/c of the fileset for machine m001.

FIG. 3E shows an example of a multi-layer partitioning. In this example, partition m001/p001 is further partitioned into random_name1, random_name2, etc. In the examples of FIGS. 3D-3E, each partition corresponds to a different alphabetical range of the namespace of the fileset of machine m001, but the partitions do not have to be defined in this way.

FIGS. 3F-3G are examples of a snapshot table 226 and image table 228, respectively, illustrating a series of backups for a partition p001 of a machine m001. Each row of the snapshot table is a different snapshot and each row of the image table is a different image. The snapshot is whatever is being backed up at that point in time. In the nomenclature of FIGS. 3F-3G, m001/p001.ss1 is a snapshot of partition p001 of machine m001 taken at time t1. In the suffix ".ss1", the .ss indicates this is a snapshot and the 1 indicates the time t1. m001/p001.ss2 is a snapshot of partition p001 of machine m001 taken at time t2, and so on. Images are what is saved in the data store 118. For example, the snapshot m001/p001.ss2 taken at time t2 may not be saved as a full backup. Rather, it may be composed of a full backup of snapshot. m001/p001.ss1 taken at time t1 plus the incremental difference between the snapshots at times t1 and t2. The full backup of snapshot m001/p001.ss1 is denoted as m001/p001.im1, where ".im" indicates this is an image and "1" indicates this is a full image of the snapshot at time t1. The incremental difference is m001/p001.im1-2 where "1-2" indicates this is an incremental image of the difference between snapshot m001/p001.ss1 and snapshot m001/p001.ss2.

In this example, the service schedule 222 indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001/p001.ss1. The ss_time is a timestamp of the snapshot, which is Oct. 1, 2017 at 3 am. im_list is the list of images used to compose the snapshot. Because this is the first snapshot taken, a full image of the snapshot is saved (m001/p001.im1). The image table 228 shows where this image is saved in the data store 118. In order to have a complete snapshot of machine m001, snapshots of all partitions are pulled and saved. For convenience, only partition p001 is shown in the figures.

On Oct. 1, 2017 at 9 am (time t2), a second backup of machine m001 is made. This results in the second row of the snapshot table for snapshot m001/p001.ss2. The image list of this snapshot is m001/p001.im1 and m001/p001.im1-2. That is, the snapshot m001/p001.ss2 is composed of the base full image m001/p001.im1 combined with the incremental image m001/p001.im1-2. The new incremental image m001/p001.im1-2 is stored in data store 118, with a corresponding entry in the image table 228. This process is performed for all partitions of the fileset and continues every 6 hours as additional snapshots are made. If partitions grow too large or small over time, they may be subdivided or combined as described below.

For virtual machines, pulling a snapshot for the VM typically includes the following steps: freezing the VM and taking a snapshot of the VM, transferring the snapshot (or the incremental differences) and releasing the VM. For example, the DMS cluster 112 may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated. FIGS. 4A-4D show an example of this. FIGS. 4A-B show the snapshot table 226 and image table 224 after backups have been taken for 3 days using the process described in FIG. 3. However, if the service schedule requires 6-hour backups only for the past 2 days, then the 6-hour backups for the first day October 1 are no longer needed. The snapshot m001/p001.ss1 is still needed because the service schedule requires daily backups, but snapshots .ss2, .ss3 and .ss4 can be deleted and are removed from the snapshot table 226. However, the incremental images .im1-2, .im2-3 and .im3-4 are still required to build the remaining snapshots.

FIGS. 4C-4D show the snapshot table 226 and the image table 228 after the base image is updated from .im1 to .im5. In updating the base image, a full image of snapshot 5 is created from the existing images. The new base image .im5 is shown as a new row in the image table 228. As shown in FIG. 4C, the im_list for snapshots .ss1 and .ss5 to .ss12 are also updated to stem from this new base image .im5. As a result, the incremental images .im1-2, .im2-3, .im3-4 and .im4-5 are no longer required and they can be deleted from the data store 118 and the image table 228. The full image .im1 also is no longer needed, although a new backwards incremental image .im5-1 is created so that snapshot .ss1 is still maintained. All of these deletions are indicated as crosshatched rows.

The description above is just one example. The various data structures may be defined in other ways and may contain additional or different information.

Figure 5A:
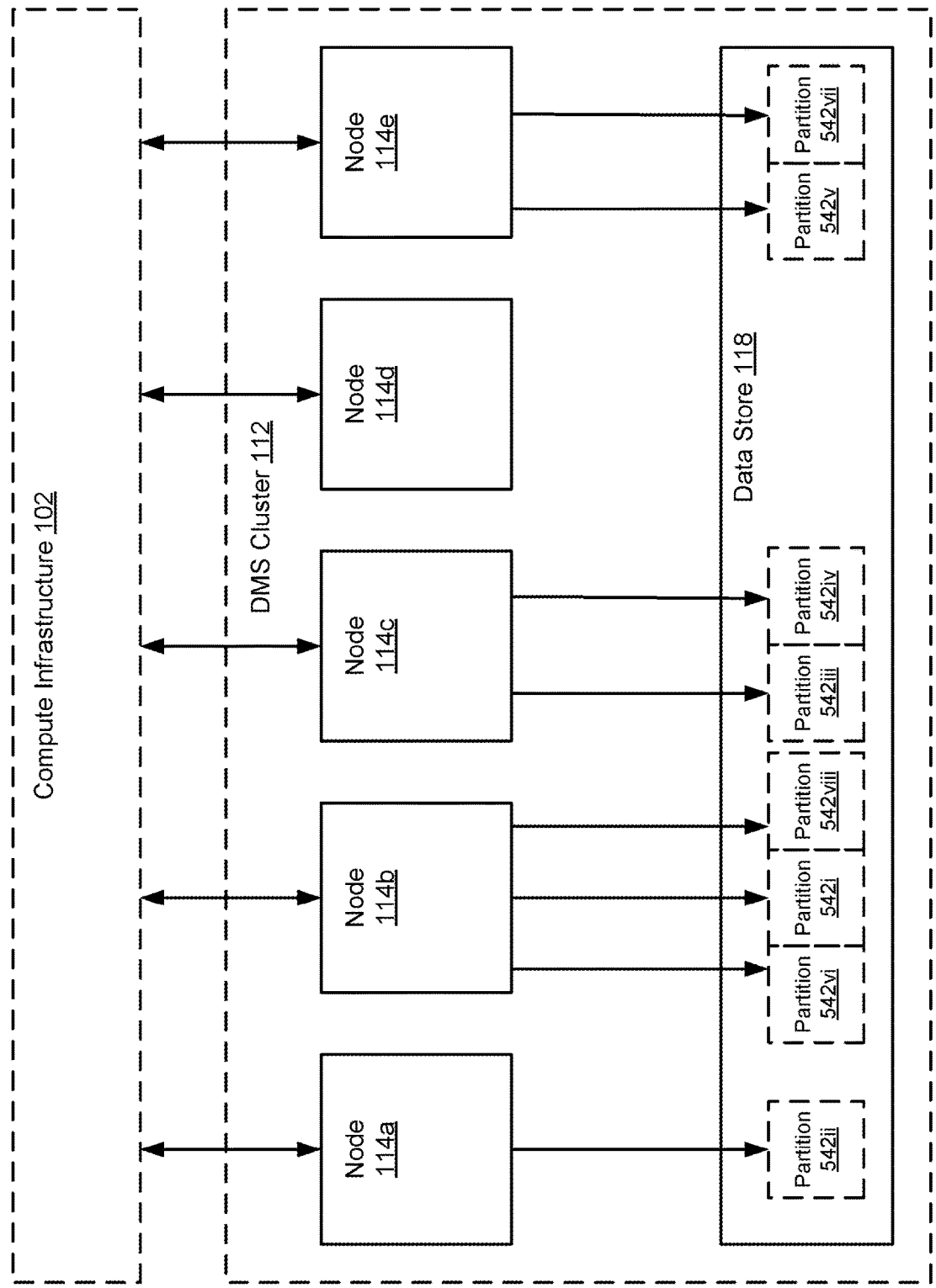
FIGS. 5A-B are block diagrams that illustrate a DMS cluster storing and updating partitioned snapshot data, according to one embodiment.
Figure 5B:
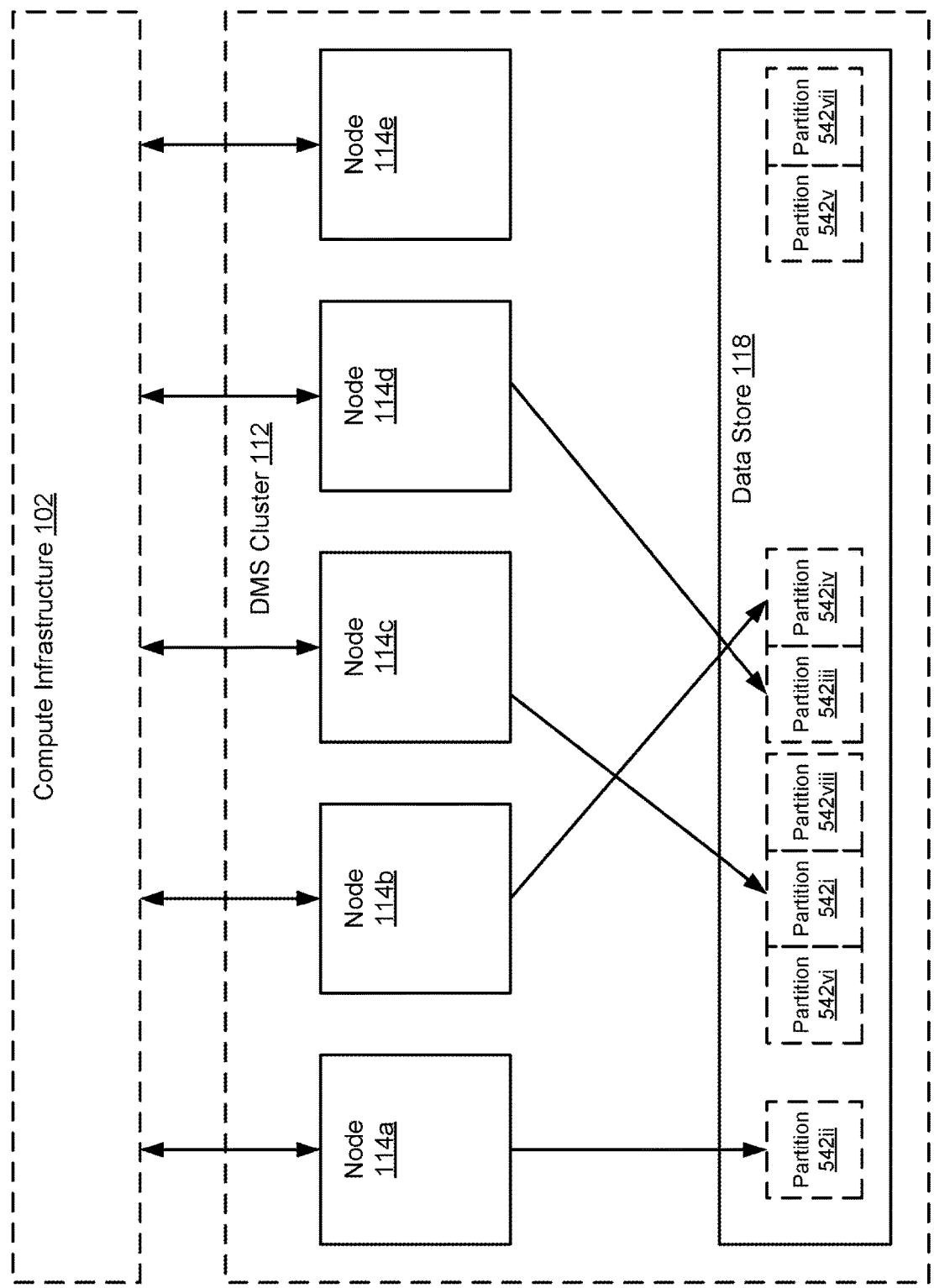

FIGS. 5A-B are block diagrams that illustrate a DMS cluster storing and updating partitioned snapshot data. Dividing a fileset into partitions and then pulling snapshots of each partition as a separate job takes advantage of the capability of each node 114 in the DMS cluster 112 to operate autonomously and in parallel with the other nodes 114. Partitioning the fileset enables the DMS cluster 112 to handle each partition separately, that is, as separate jobs performed autonomously by the nodes 114 in parallel. Performing these jobs in parallel avoids the traditional I/O speed bottleneck caused if only a single node 114 were required to pull a snapshot of the entire fileset. Instead, partitioning distributes the I/O load across the DMS cluster 112 and reduces the overall time required to pull the snapshot of the entire fileset. In some implementations, the jobs are dynamically assigned to or distributed across the peer nodes 114 in a manner that increases parallelism and/or reduces an overall time required to pull the snapshot of the fileset.

Additionally, having a separate job for each partition increases fault tolerance of the DMS cluster 112. If the DMS cluster 112 encounters an issue when pulling a snapshot of a particular partition, only the job corresponding to that particular partition needs to be re-executed. In some embodiments, the job is re-executed by a node 114 of the DMS cluster 112 different from that which initially executed it.

In FIG. 5A, the DMS cluster 112 pulls a full snapshot of a fileset in the compute infrastructure 102 according to the method of FIG. 1. One of the nodes 114a of the DMS cluster 112 executes a "pull snapshot" job from the job queue 224, initiating 12 the snapshot pull. Node 114a receives 14 fileset metadata from the computer infrastructure 102. The fileset metadata describes the fileset of which is the snapshot is being taken and may include file paths and hierarchies, file sizes, and file types (i.e., content types).

Based on the fileset metadata, node 114a defines 16 the partitions for the fileset. Preferably, the partitions are determined 16 with file-level granularity, that is, each file is fully contained within a single partition. Accordingly, if each partition is of equal size, the partition size must be as least equal to the size of the largest file in the fileset. Based on the partition size, node 114a assigns each file in the fileset to a partition. In one embodiment, each partition corresponds to a range within a namespace of the fileset, and files are assigned to partitions associated with the namespace range under which their file path falls. For example, the namespace range may be an alphabetical range (e.g., partition p001 contains "/a" to "/d," partition p002 contains "/e" to "/h," etc.). This approach maintains the performance benefits of data locality.

In another embodiment, the fileset is partitioned based on file content. In a first embodiment, files with the same content type are grouped together and the groups of files are assigned to partitions. For example, JPEG files may be grouped together and assigned to a single partition (or group of partitions such that the majority of the group of partitions only contain JPEG files). This allows the DMS cluster 112 to optimize data management based on the content type. For example, compressing a partition of stored data may be easier or more effective if all of the data in the partition is of the same type. Additionally, grouping files in this manner can inform the DMS cluster's 112 handling of different data types, such as indexing text file contents (e.g., for word searching) and post-processing of images (e.g., for facial recognition). In a second embodiment, the node 114a receives information about the contents of each file in addition to the fileset metadata and assigns files to partitions based on content similarity. For example, documents and images determined to be associated with the same topic may be assigned to the same partition. After the partitions have been defined 16, the node 114a generates 18 data fetch jobs for each of the partitions. These jobs are posted 20 to the job queue 224, where all of the nodes 114a-e can autonomously retrieve and execute 22 the jobs in parallel.

In the example of FIG. 5A, the fileset is stored in eight partitions 542i-viii of the data store 118 by the nodes 114 of the DMS cluster 112. Here, node 114a pulls a snapshot of partition 542ii; node 114b pulls snapshots of partitions 542i, vi, viii; node 114c pulls snapshots of partitions 542iii, iv; node 114d does not pull snapshots of any of the partitions; and node 114e pulls snapshots of partitions 542v, vii. As shown, not all of the nodes 114 are required to perform the data fetch jobs for the partitions 542, and some nodes 114 may perform multiple data fetch jobs (concurrently, in some cases), while others may perform only a single data fetch job. Furthermore, the data fetch jobs do not need to be performed in numerical order. Because the data store 118 is distributed across the nodes of the DMS cluster 112, each partition 542 may be stored locally at the node associated with the node 114 that pulled the snapshot for that partition 542.

In FIG. 5B, at a later time, the DMS cluster 112 pulls another snapshot of the fileset. Because prior images of partitions 542i-viii are already stored in the data store 118, this snapshot need only store incremental images of those snapshots that have changed. Assume that only partitions 542i-iv are changed. In this example, node 114c executes the data fetch job for partition 542i and stores the incremental image. The base image for partition 542i is stored locally on node 114b, so the incremental image preferably is also stored on node 114b (even though node 114c is executing the data fetch job). In one approach, data fetch jobs are assigned to nodes that store prior images. In that approach, the data fetch job for partition 542i would be assigned and executed by node 114b instead of node 114c.

In some embodiments, the DMS cluster 112 can repartition the fileset. This may be useful if portions of the fileset assigned to one partition have increased or decreased in size relative to the other portions of the fileset assigned to other partitions or fallen outside of predetermined minimum or maximum partition sizes. To do this, the DMS cluster 112 may combine and load several contiguous partitions 542 and then determine and store new partitions 542 in the data store 118. Corresponding changes are made to the snapshot table.

When pulling full or incremental snapshots, nodes 114 may fail during execution of the data fetch jobs. In response to this, the data fetch job for the partition may be re-posted to the job queue 224. The re-posted job may specify that it may not be performed by the failed node 114. Additionally, the failed node 114 may be decommissioned and prevented from executing further data fetch jobs for the snapshot after failing a threshold number of times.

Pulling snapshots at the partition-level instead of the full fileset- or machine-level also has advantages when accessing the stored data, such as in order to restore aspects of the computer infrastructure 102. First, similarly to how the DMS cluster 114 can pull snapshots of partitions in parallel, the DMS cluster 114 can also load and/or restore snapshots of partitions in parallel. This distribution of the overall I/O load results in increased overall speed. Furthermore, instead of loading the entire snapshot of a fileset, the DMS cluster 114 may load only those partitions 542 that are needed. For example, the DMS cluster 114 can restore only certain files in the fileset instead of the full fileset.

Figure 6:
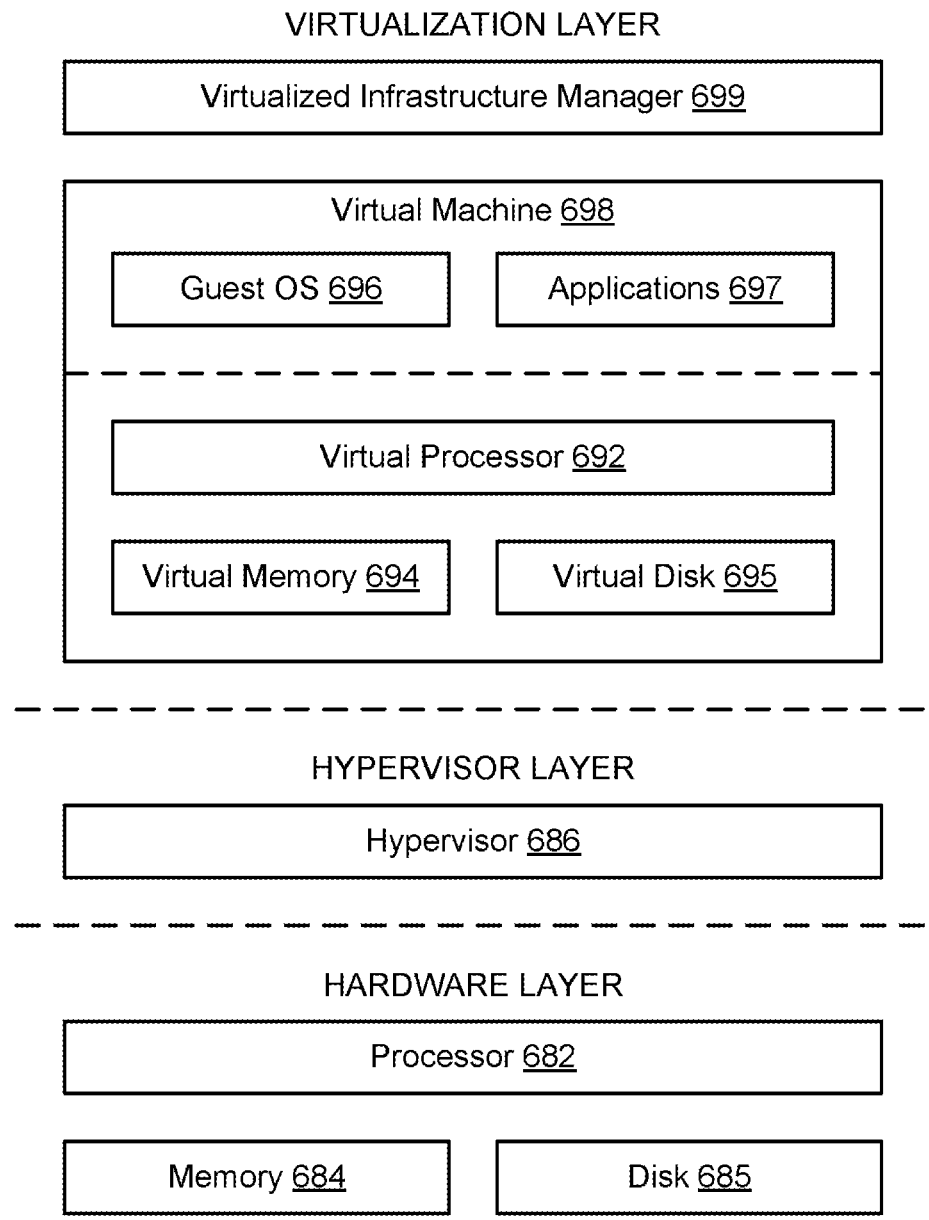
FIG. 6 is a block diagram of a virtual machine, according to one embodiment.

FIG. 6 is a block diagram of a server for a VM platform, according to one embodiment. The server includes hardware-level components and software-level components. The hardware-level components include one or more processors 682, one or more memory 684, and one or more storage devices 685. The software-level components include a hypervisor 686, a virtualized infrastructure manager 699, and one or more virtual machines 698. The hypervisor 686 may be a native hypervisor or a hosted hypervisor. The hypervisor 686 may provide a virtual operating platform for running one or more virtual machines 698. Virtual machine 698 includes a virtual processor 692, a virtual memory 694, and a virtual disk 695. The virtual disk 695 may comprise a file stored within the physical disks 685. In one example, a virtual machine may include multiple virtual disks, with each virtual disk associated with a different file stored on the physical disks 685. Virtual machine 698 may include a guest operating system 696 that runs one or more applications, such as application 697. Different virtual machines may run different operating systems. The virtual machine 698 may load and execute an operating system 696 and applications 697 from the virtual memory 694. The operating system 696 and applications 697 used by the virtual machine 698 may be stored using the virtual disk 695. The virtual machine 698 may be stored as a set of files including (a) a virtual disk file for storing the contents of a virtual disk and (b) a virtual machine configuration file for storing configuration settings for the virtual machine. The configuration settings may include the number of virtual processors 692 (e.g., four virtual CPUs), the size of a virtual memory 694, and the size of a virtual disk 695 (e.g., a 6 GB virtual disk) for the virtual machine 695.

The virtualized infrastructure manager 699 may run on a virtual machine or natively on the server. The virtualized infrastructure manager 699 corresponds to the virtualization module 66 above and may provide a centralized platform for managing a virtualized infrastructure that includes a plurality of virtual machines. The virtualized infrastructure manager 699 may manage the provisioning of virtual machines running within the virtualized infrastructure and provide an interface to computing devices interacting with the virtualized infrastructure. The virtualized infrastructure manager 699 may perform various virtualized infrastructure related tasks, such as cloning virtual machines, creating new virtual machines, monitoring the state of virtual machines, and facilitating backups of virtual machines.

Figure 7:
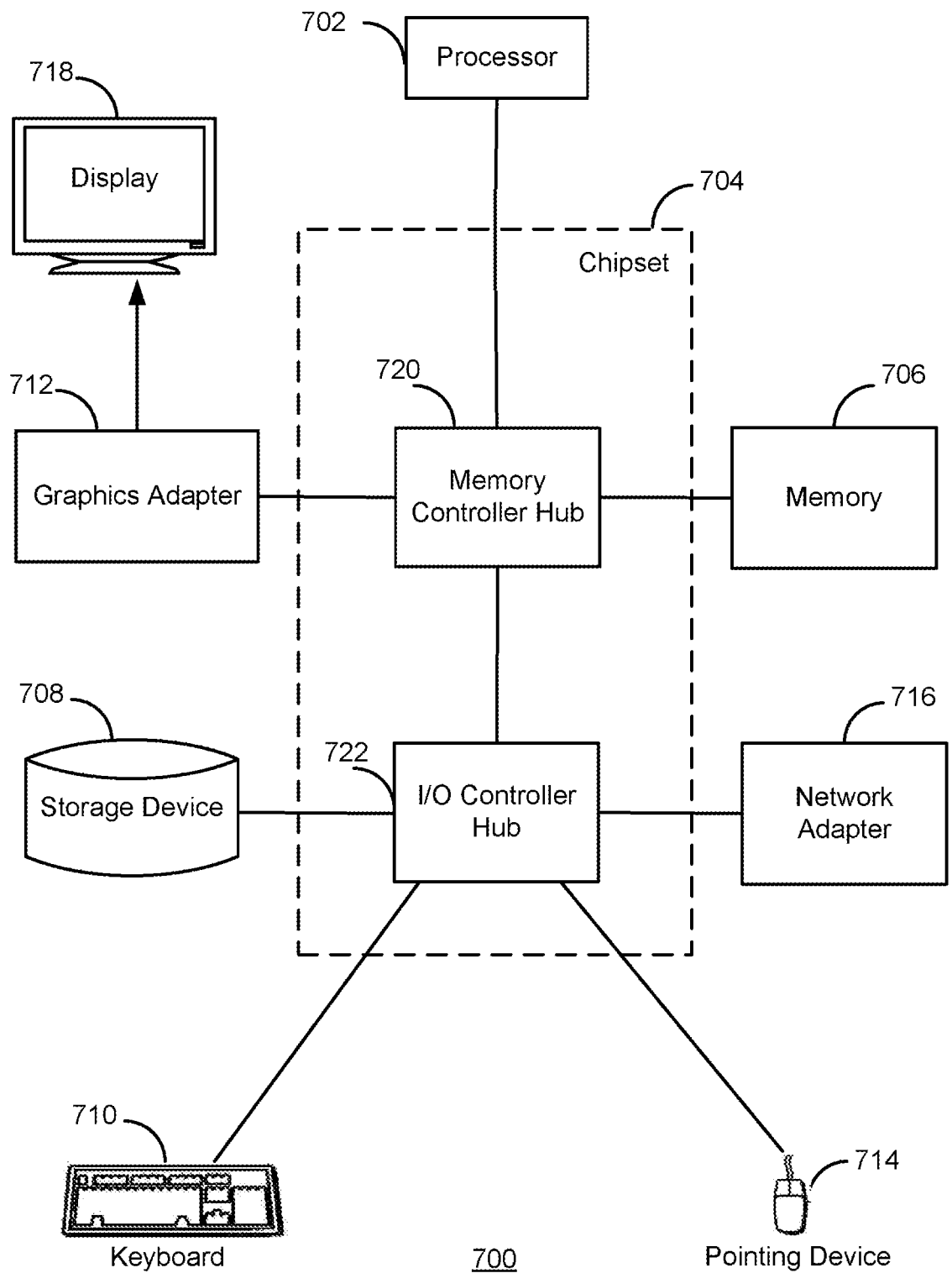
FIG. 7 is a block diagram of a computer system suitable for use in a DMS system, according to one embodiment.

FIG. 7 is a high-level block diagram illustrating an example of a computer system 700 for use as one or more of the components shown above, according to one embodiment. Illustrated are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds instructions and data used by the processor 702. The pointing device 714 is used in combination with the keyboard 710 to input data into the computer system 700. The graphics adapter 712 displays images and other information on the display device 718. In some embodiments, the display device 718 includes a touch screen capability for receiving user input and selections. The network adapter 716 couples the computer system 700 to a network. Some embodiments of the computer 700 have different and/or other components than those shown in FIG. 7. For example, the virtual machine 102, the physical machine 104, and/or the DMS node 70 in FIG. 2A can be formed of multiple blade servers and lack a display device, keyboard, and other components.

The computer 700 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 708, loaded into the memory 706, and executed by the processor 702.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method, comprising:
receiving, by a data management and storage (DMS) cluster that stores data from a compute infrastructure comprising a plurality of machines, a request to take a snapshot of a fileset from a first machine of the plurality of machines, wherein the DMS cluster has N available DMS nodes, N being a variable representing an integer quantity of available DMS nodes, and wherein partitions for the fileset are undefined prior to the request to take the snapshot being received;
obtaining, by the DMS cluster, fileset metadata associated with the fileset;
determining, by the DMS cluster, whether to divide the fileset into a plurality of partitions based on the fileset metadata prior to taking the snapshot of the fileset and in response to the request to take the snapshot;
defining, by the DMS cluster, based on determining to divide the fileset in response to the request to take the snapshot, and prior to taking the snapshot of the fileset, the plurality of partitions for the fileset based on the fileset metadata;
creating, by the DMS cluster, to take the snapshot of the fileset, a plurality of jobs for taking snapshots associated with the plurality of partitions, wherein a job of the plurality of jobs corresponds to a single partition of the plurality of partitions;
executing in parallel, by the N available DMS nodes of the DMS cluster, the plurality of jobs to obtain a plurality of snapshots associated with the plurality of partitions, wherein a respective job obtains a respective snapshot of the plurality of snapshots for a respective partition of the plurality of partitions;
storing respective snapshots of the plurality of snapshots associated with the plurality of partitions in respective DMS nodes of a distributed data store implemented across the N available DMS nodes of the DMS cluster, wherein the N available DMS nodes are physically separated from one another; and
restoring in parallel, two or more partitions of the plurality of partitions of the fileset using the respective snapshots of the two or more partitions stored in the respective DMS nodes.

2. The method of claim 1, wherein determining whether to divide the fileset into the plurality of partitions is based on a size of the fileset.

3. The method of claim 1, wherein determining whether to divide the fileset into the plurality of partitions is based on a predetermined partition size.

4. The method of claim 1, wherein the first machine is a virtual machine, and the fileset comprises a virtual disk file.

5. The method of claim 1, wherein the DMS cluster maintains information identifying a correspondence between the plurality of partitions and the fileset.

6. The method of claim 5, wherein the information associates a first partition of the plurality of partitions to a first DMS node of the N available DMS nodes, and the first DMS node stores data associated with the first partition.

7. The method of claim 1, wherein the fileset includes multiple files.

8. A data management and storage (DMS) system, wherein the DMS system comprises:
one or more processors; and
one or more non-transitory computer-readable storage media, operatively coupled with at least one of the one or more processors, comprising instructions that, when executed by the one or more processors, cause the DMS system to:
receive a request to take a snapshot of a fileset from a first machine of a plurality of machines, wherein the DMS system comprises a DMS cluster that stores data from a compute infrastructure, the compute infrastructure comprises the plurality of machines, and the DMS cluster has N available DMS nodes, N being a variable representing an integer quantity of available DMS nodes, and wherein partitions for the fileset are undefined prior to the request to take the snapshot being received;
obtain fileset metadata associated with the fileset;
determine whether to divide the fileset into a plurality of partitions based on the fileset metadata prior to taking the snapshot of the fileset and in response to the request to take the snapshot;
define, based on determining to divide the fileset in response to the request to take the snapshot and prior to taking the snapshot of the fileset, the plurality of partitions for the fileset based on the fileset metadata;
create, to take the snapshot of the fileset, a plurality of jobs for taking snapshots associated with the plurality of partitions, wherein a job of the plurality of jobs corresponds to a single partition of the plurality of partitions;
execute in parallel, by the N available DMS nodes of the DMS cluster, the plurality of jobs to obtain a plurality of snapshots associated with the plurality of partitions, wherein a respective job obtains a respective snapshot of the plurality of snapshots for a respective partition of the plurality of partitions;
store respective snapshots of the plurality of snapshots associated with the plurality of partitions in respective DMS nodes of a distributed data store implemented across the N available DMS nodes of the DMS cluster, wherein the N available DMS nodes are physically separated from one another; and
restore in parallel, two or more partitions of the plurality of partitions of the fileset using the respective snapshots of the two or more partitions stored in the respective DMS nodes.

9. The DMS system of claim 8, wherein determining whether to divide the fileset into the plurality of partitions is based on a size of a file of the fileset indicated by the fileset metadata.

10. The DMS system of claim 8, wherein determining whether to divide the fileset into the plurality of partitions is based on a predetermined partition size.

11. The DMS system of claim 8, wherein the first machine is a virtual machine, and the fileset comprises a virtual disk file.

12. The DMS system of claim 8, wherein the DMS cluster maintains information identifying a correspondence between the plurality of partitions and the fileset.

13. The DMS system of claim 12, wherein the information associates a first partition of the plurality of partitions to a first DMS node of the N available DMS nodes, and the first DMS node stores data associated with the first partition.

14. The DMS system of claim 8, wherein the fileset includes multiple files.

15. One or more non-transitory computer-readable storage media comprising instructions that, when executed by one or more processors, cause a data management and storage (DMS) system to:
receive a request to take a snapshot of a fileset from a first machine of a plurality of machines, wherein the DMS system comprises a DMS cluster that stores data from a compute infrastructure, the compute infrastructure comprises the plurality of machines, and the DMS cluster has N available DMS nodes, N being a variable representing an integer quantity of available DMS nodes, and wherein partitions for the fileset are undefined prior to the request to take the snapshot being received;
obtain fileset metadata associated with the fileset;
determine whether to divide the fileset into a plurality of partitions based on the fileset metadata prior to taking the snapshot of the fileset and in response to the request to take the snapshot;
define, based on determining to divide the fileset in response to the request to take the snapshot and prior to taking the snapshot of the fileset, the plurality of partitions for the fileset based on the fileset metadata;
create, to take the snapshot of the fileset, a plurality of jobs for taking snapshots associated with the plurality of partitions, wherein a job of the plurality of jobs corresponds to a single partition of the plurality of partitions;
execute in parallel, by the N available DMS nodes of the DMS cluster, the plurality of jobs to obtain a plurality of snapshots associated with the plurality of partitions, wherein a respective job obtains a respective snapshot of the plurality of snapshots for a respective partition of the plurality of partitions;
store respective snapshots of the plurality of snapshots associated with the plurality of partitions in respective DMS nodes of a distributed data store implemented across the N available DMS nodes of the DMS cluster, wherein the N available DMS nodes are physically separated from one another; and
restore in parallel, two or more partitions of the plurality of partitions of the fileset using the respective snapshots of the two or more partitions stored in the respective DMS nodes.

16. The one or more non-transitory computer-readable storage media of claim 15, wherein determining whether to divide the fileset into the plurality of partitions is based on a size of the fileset.

17. The one or more non-transitory computer-readable storage media of claim 15, wherein determining whether to divide the fileset into the plurality of partitions is based on a predetermined partition size.

18. The one or more non-transitory computer-readable storage media of claim 15, wherein the first machine is a virtual machine, and the fileset comprises a virtual disk file.

19. The one or more non-transitory computer-readable storage media of claim 15, wherein the DMS cluster maintains information identifying a correspondence between the plurality of partitions and the fileset.

20. The one or more non-transitory computer-readable storage media of claim 15, wherein the fileset includes multiple files.

\* \* \* \* \*